US008204247B2

(12) United States Patent
Elko et al.

(10) Patent No.: US 8,204,247 B2
(45) Date of Patent: Jun. 19, 2012

(54) POSITION-INDEPENDENT MICROPHONE SYSTEM

(75) Inventors: Gary W. Elko, Summit, NJ (US); Jens M. Meyer, New York, NY (US)

(73) Assignee: MH Acoustics, LLC, Summit, NJ (US)

(*) Notice: Subject to any disclaimer, the term of this patent is extended or adjusted under 35 U.S.C. 154(b) by 1318 days.

(21) Appl. No.: 11/817,033

(22) PCT Filed: Mar. 6, 2006

(86) PCT No.: PCT/US2006/007800

§ 371 (c)(1),
(2), (4) Date: Aug. 24, 2007

(87) PCT Pub. No.: WO2006/110230

PCT Pub. Date: Oct. 19, 2006

(65) Prior Publication Data

US 2008/0247565 A1 Oct. 9, 2008

Related U.S. Application Data

(63) Continuation-in-part of application No. 10/500,938, filed as application No. PCT/US03/00741 on Jan. 10, 2003, now Pat. No. 7,587,054.

(60) Provisional application No. 60/659,787, filed on Mar. 9, 2005.

(51) Int. Cl.
*H04R 3/00* (2006.01)
*G06F 17/00* (2006.01)

(52) U.S. Cl. ........................................... 381/92; 700/94

(58) Field of Classification Search .................... 381/92, 381/94.1–94.3, 98; 700/94
See application file for complete search history.

(56) References Cited

U.S. PATENT DOCUMENTS 4,042,779 A 8/1977 Craven et al. ............. 179/1 DM
5,288,955 A 2/1994 Staple et al. .................. 181/158
(Continued)

FOREIGN PATENT DOCUMENTS

EP 0 381 498 A 8/1990
(Continued)

OTHER PUBLICATIONS

Nelson, P. A. et al., "Spherical Harmonics, Singular-Value Decomposition and the Head-Related Transfer Function", Journal of Sound and Vibration (2001) 239(4), p. 607-637.

(Continued)

*Primary Examiner* — Ping Lee
(74) *Attorney, Agent, or Firm* — Mendelsohn, Drucker & Associates, P.C.; Steve Mendelsohn

(57) ABSTRACT

An audio system generates position-independent auditory scenes using harmonic expansions based on the audio signals generated by a microphone array. In one embodiment, a plurality of audio sensors are mounted on the surface of a sphere. The number and location of the audio sensors on the sphere are designed to enable the audio signals generated by those sensors to be decomposed into a set of eigenbeam outputs. Compensation data corresponding to at least one of the estimated distance and the estimated orientation of the sound source relative to the array are generated from eigenbeam outputs and used to generate an auditory scene. Compensation based on estimated orientation involves steering a beam formed from the eigenbeam outputs in the estimated direction of the sound source to increase direction independence, while compensation based on estimated distance involves frequency compensation of the steered beam to increase distance independence.

31 Claims, 8 Drawing Sheets

400

U.S. PATENT DOCUMENTS

| | | | | |
|---|---|---|---|---|
| 6,041,127 | A | 3/2000 | Elko | 381/92 |
| 6,072,878 | A | 6/2000 | Moorer | 381/18 |
| 6,239,348 | B1 | 5/2001 | Metcalf | 84/723 |
| 6,317,501 | B1 | 11/2001 | Matsuo | 381/92 |
| 6,526,147 | B1 | 2/2003 | Rung | 381/92 |
| 6,904,152 | B1 | 6/2005 | Moorer | 381/18 |
| 2003/0147539 | A1 * | 8/2003 | Elko et al. | 381/92 |
| 2005/0195988 | A1 * | 9/2005 | Tashev et al. | 381/92 |

FOREIGN PATENT DOCUMENTS

| | | | |
|---|---|---|---|
| EP | 0 869 697 | A | 10/1998 |
| EP | 1 571 875 | A | 9/2005 |
| JP | 11 168792 | A | 9/1999 |
| WO | WO 95/29479 | | 11/1995 |
| WO | WO 01/58209 | A1 | 8/2001 |
| WO | WO 03/061336 | A | 7/2003 |

OTHER PUBLICATIONS

P. M. Morse, K. U. Ingard: "Theoretical Acoustics" 1986, Princeton University Press, Princeton (New Jersey), ISBN: 0-691-02401-4, pp. 333-356, XP007906606.

Meyer Jens: "Beamforming for a Circular Microphone Array Mounted on Spherically Shaped Objects" Journal of the Acoustical Society of America, AIP/Acoustical Society of America, Melville, NY, US, Bd. 109, Nr. 1, Jan. 1, 2001, pp. 185-193, XP012002081, ISSN: 0001-4966.

Jérome Daniel, "Représentation de champs acoustiques, application à la transmission et à la reproduction des scènes sonores complexes dans un contexte multimédia," Ph.D. Thesis (2000), pp. 149-204, XP007909831.

* cited by examiner (a)

(b)

POSITION-INDEPENDENT MICROPHONE SYSTEM

CROSS-REFERENCE TO RELATED APPLICATIONS

This application claims the benefit of the filing date of U.S. provisional application No. 60/659,787, filed on Mar. 9, 2005, the teachings of which are incorporated herein by reference.

In addition, this application is a continuation-in-part of U.S. patent application Ser. No. 10/500,938, filed on Jul. 8, 2004, which is a 371 of PCT/US03/00741, filed on Jan. 10, 2003, which itself claims the benefit of the filing date of U.S. provisional application No. 60/347,656, filed on Jan. 11, 2002 and U.S. patent application Ser. No. 10/315,502, filed on Dec. 10, 2002, the teachings of all of which are incorporated herein by reference.

BACKGROUND OF THE INVENTION

1. Field of the Invention

The present invention relates to acoustics, and, in particular, to microphone arrays.

2. Description of the Related Art

A microphone array-based audio system typically comprises two units: an arrangement of (a) two or more microphones (i.e., transducers that convert acoustic signals (i.e., sounds) into electrical audio signals) and (b) a beamformer that combines the audio signals generated by the microphones to form an auditory scene representative of at least a portion of the acoustic sound field. This combination enables picking up acoustic signals dependent on their direction of propagation. As such, microphone arrays are sometimes also referred to as spatial filters. Their advantage over conventional directional microphones, such as shotgun microphones, is their high flexibility due to the degrees of freedom offered by the plurality of microphones and the processing of the associated beamformer. The directional pattern of a microphone array can be varied over a wide range. This enables, for example, steering the look direction, adapting the pattern according to the actual acoustic situation, and/or zooming in to or out from an acoustic source. All this can be done by controlling the beamformer, which is typically implemented in software, such that no mechanical alteration of the microphone array is needed.

There are several standard microphone array geometries. The most common one is the linear array. Its advantage is its simplicity with respect to analysis and construction. Other geometries include planar arrays, random arrays, circular arrays, and spherical arrays. The spherical array has several advantages over the other geometries. The beampattern can be steered to any direction in three-dimensional (3-D) space, without changing the shape of the pattern. The spherical array also allows full 3D control of the beampattern.

Speech pick-up with high signal-to-noise ratio (SNR) is essential for many communication applications. In noisy environments, a common solution is based on farfield microphone array technology. However, for highly noise-contaminated environments, the achievable gain might not be sufficient. In these cases, a close-talking microphone may work better. Close-talking microphones, also known as noise-canceling microphones, exploit the nearfield effect of a close source and a differential microphone array, in which the frequency response of a differential microphone array to a nearfield source is substantially flat at low frequencies up to a cut-off frequency. On the other hand, the frequency response of a differential microphone array to a farfield source shows a high-pass behavior.

FIGS. 1(*a*) and 1(*b*) graphically show the normalized frequency response of a first-order differential microphone array over kd/2, where k is the wavenumber (which is equal to $2\pi/\lambda$, where $\lambda$ is wavelength) and d is the distance between the two microphones in the first-order differential array, for various distances and incidence angles, respectively, where an incidence angle of 0 degrees corresponds to an endfire orientation. All frequency responses are normalized to the sound pressure present at the center of the array. The thick curve in each figure corresponds to the farfield response at 0 degrees. The other curves in FIG. 1(*a*) are for an incidence angle of 0 degrees, and the other curves in FIG. 1(*b*) are for a distance r of 2*d*. The improvement in SNR corresponds to the area in the figure between the close-talking response and the farfield response. Note that the improvement is actually higher than can be seen in the figures due to the 1/r behavior of the sound pressure from a point source radiator. This effect is eliminated in the figure by normalizing the sound pressure in order to concentrate on the close-talking effect. It can be seen that the noise attenuation as well as the frequency response of the array depend highly on the distance and orientation of the close-taking array relative to the nearfield source.

Heinz Teutsch and Gary W. Elko, "An adaptive close-talking microphone array," *Proceedings of the WASSPA*, New Paltz, N.Y., October 2001, the teachings of which are incorporated herein by reference, describe an adaptive method that estimates the distances and the orientation of a close-talking array based on time delay of arrival (TDOA) and relative signal level. The estimated parameters are used to generate a correction filter resulting in a flat frequency response for the close-talking array independent of array position. While this method provides a large improvement over conventional close-talking microphone arrays, it does not allow recovering the loss in attenuation of farfield sources due to orientation of the microphone array. As can be seen in FIG. 1(*b*), this loss can be significant. In addition, the array will become more sensitive to the orientation with increasing differential order as the main lobe becomes narrower.

SUMMARY OF THE INVENTION

According to one embodiment, the present invention is a method for processing audio signals corresponding to sound received from a sound source. A plurality of audio signals are received, where each audio signal has been generated by a different sensor of a microphone array. The plurality of audio signals are decomposed into a plurality of eigenbeam outputs, wherein each eigenbeam output corresponds to a different eigenbeam for the microphone array. Based on one or more of the eigenbeam outputs, compensation data is generated corresponding to at least one of (i) an estimate of distance between the microphone array and the sound source and (ii) an estimate of orientation of the sound source relative to the microphone array. An auditory scene is generated from one or more of the eigenbeam outputs, wherein generation of the auditory scene comprises compensation based on the compensation data.

According to another embodiment, the present invention is an audio system for processing audio signals corresponding to sound received from a sound source. The audio system comprises a modal decomposer and a modal beamformer. The modal decomposer (1) receives a plurality of audio signals, each audio signal having been generated by a different sensor of a microphone array, and (2) decomposes the plurality of audio signals into a plurality of eigenbeam outputs, wherein each eigenbeam output corresponds to a different eigenbeam for the microphone array. The modal beamformer (1) generates, based on one or more of the eigenbeam outputs, compensation data corresponding to at least one of (i) an estimate of distance between the microphone array and the sound source and (ii) an estimate of orientation of the sound source relative to the microphone array, and (2) generates an auditory scene from one or more of the eigenbeam outputs, wherein generation of the auditory scene comprises compensation based on the compensation data.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
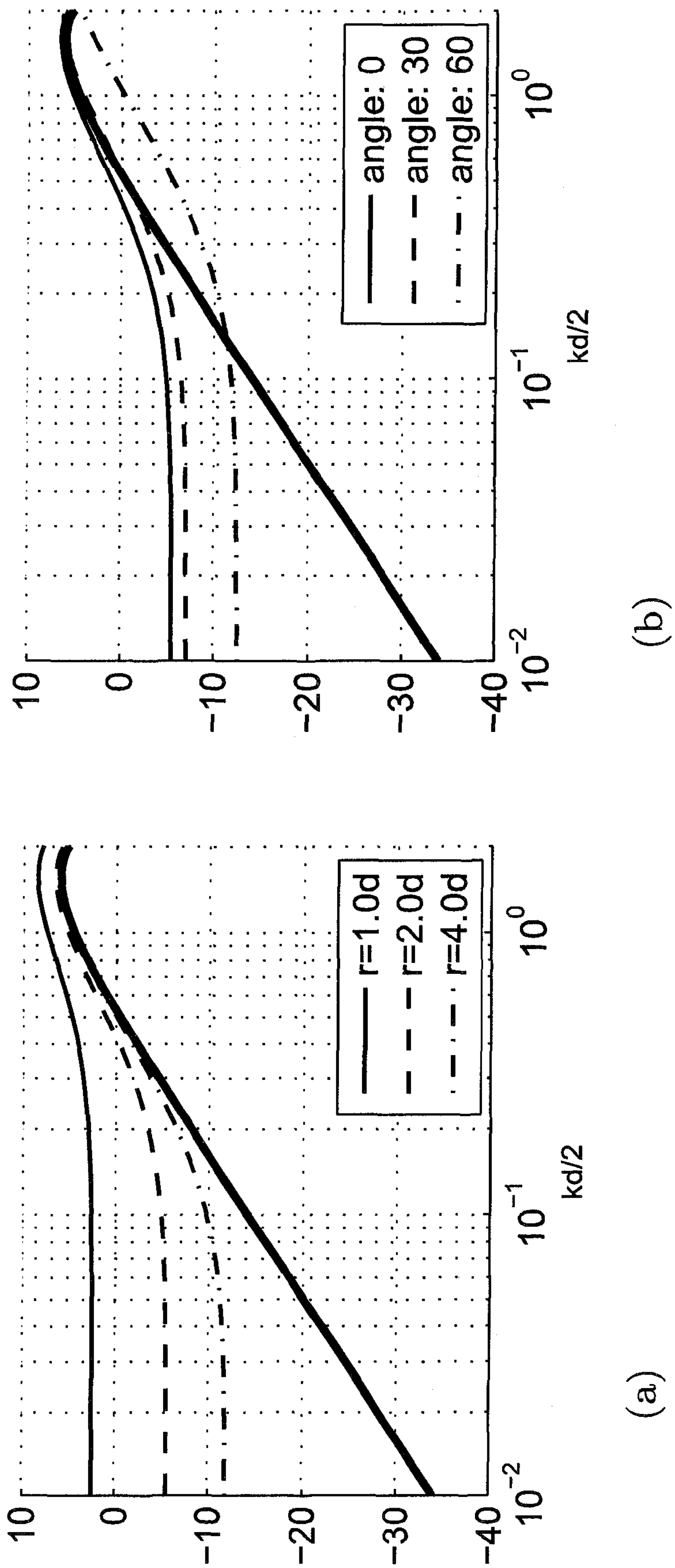
FIGS. 1(*a*) and 1(*b*) graphically show the normalized frequency response of a first-order differential microphone array for various distances and incidence angles.

According to certain embodiments of the present invention, a microphone array consisting of a plurality of audio sensors (e.g., microphones) generates a plurality of (time-varying) audio signals, one from each audio sensor in the array. The audio signals are then decomposed (e.g., by a digital signal processor or an analog multiplication network) into a (time-varying) series expansion involving discretely sampled (e.g., spherical) harmonics, where each term in the series expansion corresponds to the (time-varying) coefficient for a different three-dimensional eigenbeam.

Note that the number and location of microphones in the array determine the order of the harmonic expansion, which in turn determines the number and types of eigenbeams in the decomposition. For example, as described in more detail below, an array having four appropriately located microphones supports a discrete first-order harmonic expansion involving one zero-order eigenbeam and three first-order eigenbeams, while an array having nine appropriately located microphones supports a discrete second-order harmonic expansion involving one zero-order eigenbeam, three first-order eigenbeams, and five second-order eigenbeams.

The set of eigenbeams form an orthonormal set such that the inner-product between any two discretely sampled eigenbeams at the microphone locations, is ideally zero and the inner-product of any discretely sampled eigenbeam with itself is ideally one. This characteristic is referred to herein as the discrete orthonormality condition. Note that, in real-world implementations in which relatively small tolerances are allowed, the discrete orthonormality condition may be said to be satisfied when (1) the inner-product between any two different discretely sampled eigenbeams is zero or at least close to zero and (2) the inner-product of any discretely sampled eigenbeam with itself is one or at least close to one. The time-varying coefficients corresponding to the different eigenbeams are referred to herein as eigenbeam outputs, one for each different eigenbeam.

The eigenbeams can be used to generate data corresponding to estimates of the distance and the orientation of the sound source relative to the microphone array. The orientation-related data can then be used to process the audio signals generated by the microphone array (either in real-time or subsequently, and either locally or remotely, depending on the application) to form and steer a beam in the estimated direction of the sound source to create an auditory scene that optimizes the signal-to-noise ratio of the processed audio signals. Such beamforming creates the auditory scene by selectively applying different weighting factors (corresponding to the estimated direction) to the different eigenbeam outputs and summing together the resulting weighted eigenbeams.

In addition, the distance-related data can be used to compensate the frequency and/or amplitude responses of the microphone array for the estimated separation between the sound source and the microphone array.

In this way, the microphone array and its associated signal processing elements can be operated as a position-independent microphone system that can be steered towards the sound source without having to change the location or the physical orientation of the array, in order to achieve substantially constant performance for a sound source located at any arbitrary orientation relative to the array and located over a relatively wide range of distances from the array spanning from the nearfield to the farfield.

An extension of the compensation for the nearfield effect as described above is the use of position and orientation information to effect a desired modification of the audio output of the microphone. Thus, one can use the distance and orientation signals to make desired real-time modifications of the audio stream derived from the microphone distance and orientation of the microphone. For instance, one could control a variable filter that would alter its settings as a function of position or orientation. Also, one could use the distance estimate to control the suppression of the microphone output, thereby increasing the attenuation of the microphone to yield a desired attenuation that could either exceed or lower the attenuation of the microphone output signal. One could define regions (distance and orientation) of desired signals and regions of suppression of unwanted sources.

In order to make a particular-order harmonic expansion practicable, embodiments of the present invention are based on microphone arrays in which a sufficient number of audio sensors are mounted on the surface of a suitable structure in a suitable pattern. For example, in one embodiment, a number of audio sensors are mounted on the surface of an acoustically rigid sphere in a pattern that satisfies or nearly satisfies the above-mentioned discrete orthonormality condition. (Note that the present invention also covers embodiments whose sets of beams are mutually orthogonal without requiring all beams to be normalized.) As used in this specification, a structure is acoustically rigid if its acoustic impedance is much larger than the characteristic acoustic impedance of the medium surrounding it. The highest available order of the harmonic expansion is a function of the number and location of the sensors in the microphone array, the upper frequency limit, and the radius of the sphere.

In alternative embodiments, the audio sensors are not mounted on the surface of an acoustically rigid sphere. For example, the audio sensors could be mounted on the surface of an acoustically soft sphere or even an open sphere.

First-Order Audio System

Figure 2:
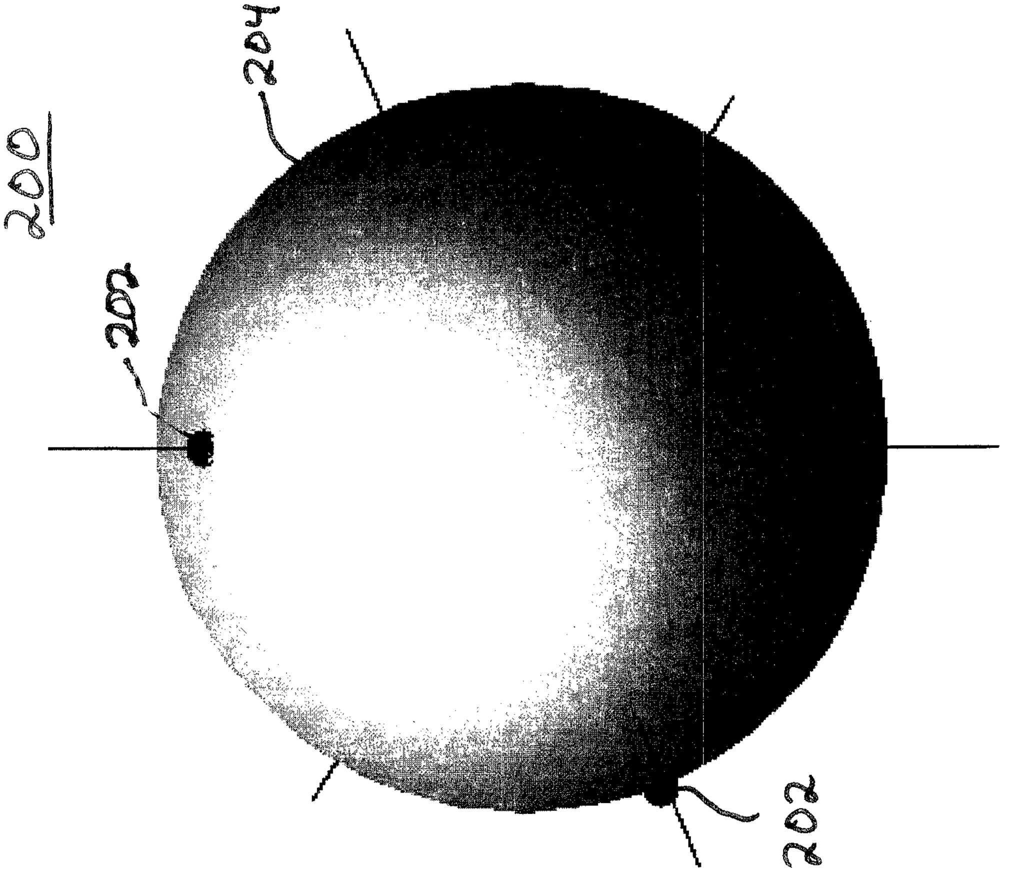
FIG. 2 shows a schematic diagram of a four-sensor microphone array.
Figure 3:
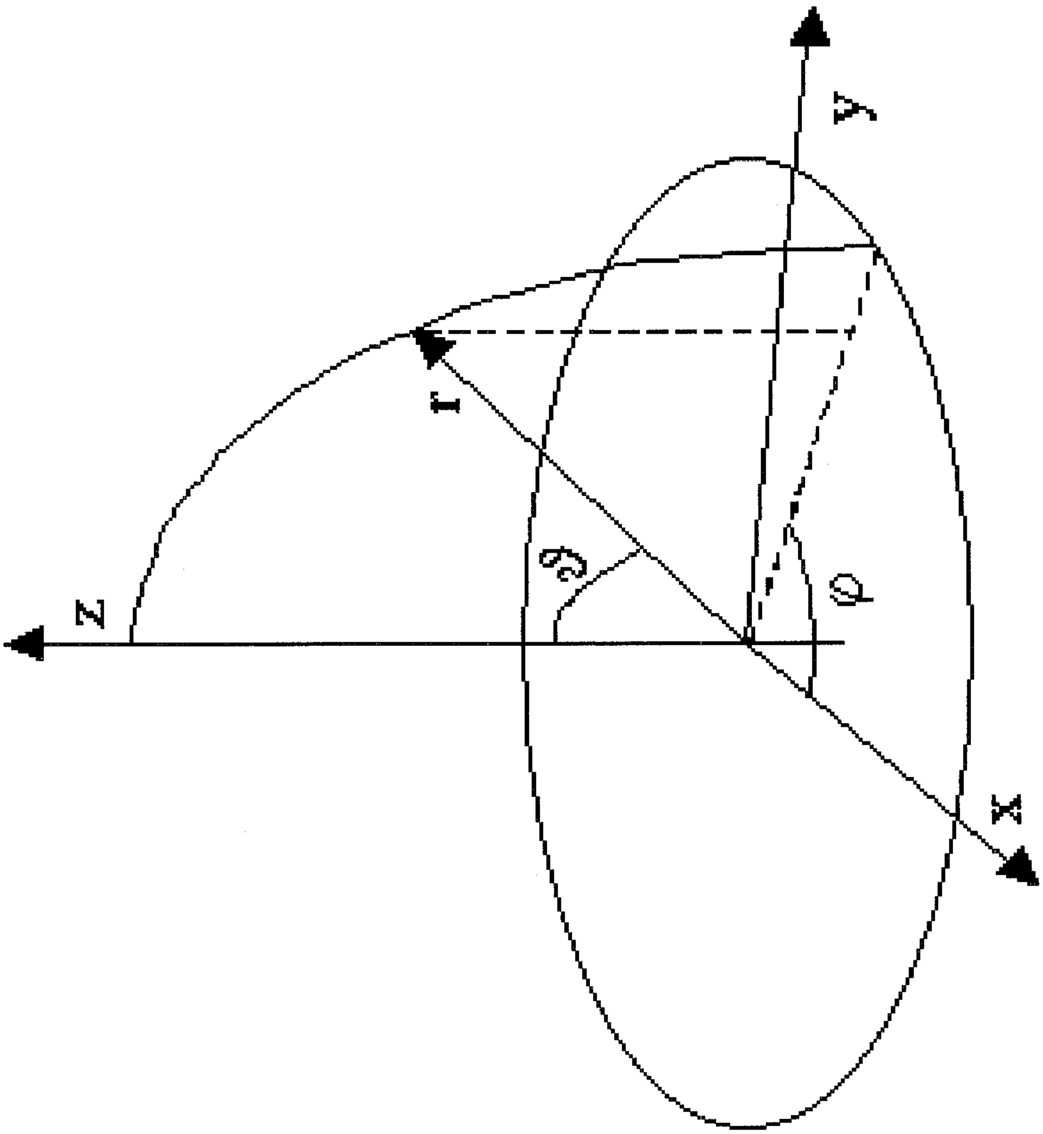
FIG. 3 graphically represents the spherical coordinate system used in this specification.

FIG. 2 shows a schematic diagram of a four-sensor microphone array 200 having four microphones 202 positioned on the surface of an acoustically rigid sphere 204 at the spherical coordinates specified in Table I, where the origin is at the center of the sphere, the Z axis passes through one of the four microphones (Microphone #1 in Table I), the elevation angle is measured from the Z axis, and the azimuth angle is measured from the X axis in the XY plane, as indicated by the spherical coordinate system represented in FIG. 3. Microphone array 200 supports a discrete first-order harmonic expansion involving the zero-order eigenbeam $Y_0$ and the three first-order eigenbeams ($Y_1^{-1}, Y_1^{0}, Y_1^{1}$).

TABLE I

FOUR-MICROPHONE ARRAY

| Microphone | Azimuth Angle (ϕ) | Elevation Angle (υ) |
|---|---|---|
| #1 | 0° | 0° |
| #2 | 0° | 109.5° |
| #3 | 120° | 109.5° |
| #4 | 240° | 109.5° |

Figure 4:
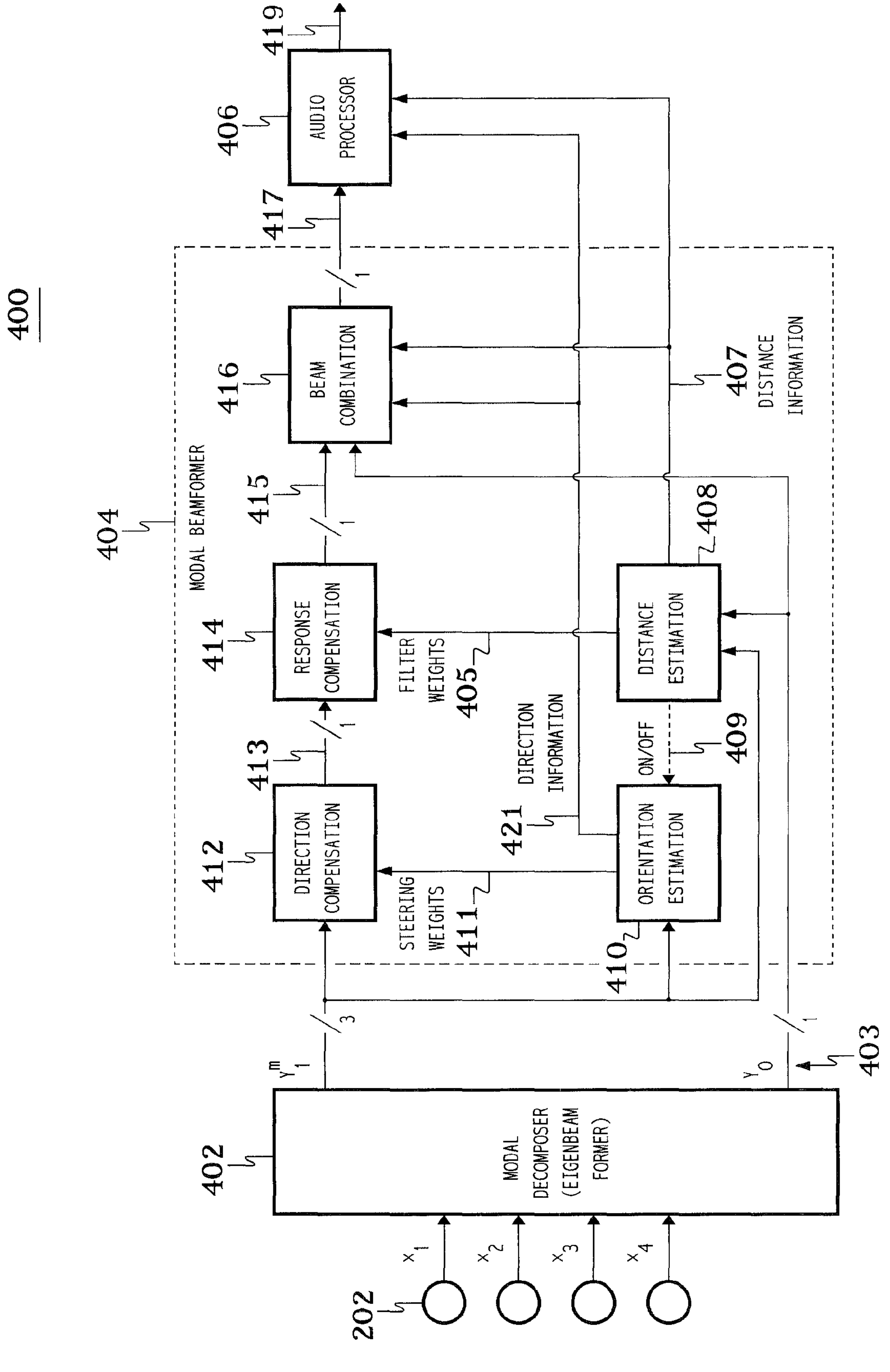
FIG. 4 shows a block diagram of a first-order audio system, according to one embodiment of the present invention.

FIG. 4 shows a block diagram of a first-order audio system 400, according to one embodiment of the present invention, based on microphone array 200 of FIG. 2. Audio system 400 comprises the four microphones 202 of FIG. 2 mounted on acoustically rigid sphere 204 (not shown in FIG. 4) in the locations specified in Table I. In addition, audio system 400 includes a modal decomposer (i.e., eigenbeam former) 402, a modal beamformer 404, and an (optional) audio processor 406. In this particular embodiment, modal beamformer 404 comprises distance estimation unit 408, orientation estimation unit 410, direction compensation unit 412, response compensation unit 414, and beam combination unit 416, each of which will be discussed in further detail later in this specification.

Each microphone 202 in system 400 generates a time-varying analog or digital (depending on the implementation) audio signal $x_i$ corresponding to the sound incident at the location of that microphone, where audio signal $x_i$ is transmitted to modal decomposer 402 via some suitable (e.g., wired or wireless) connection.

Modal decomposer 402 decomposes the audio signals generated by the different microphones to generate a set of time-varying eigenbeam outputs $Y_n^m$, where each eigenbeam output corresponds to a different eigenbeam for the microphone array. These eigenbeam outputs are then processed by beamformer 404 to generate a steered beam 417, which is optionally processed by audio processor 406 to generate an output auditory scene 419. In this specification, the term "auditory scene" is used generically to refer to any desired output from an audio system, such as system 400 of FIG. 4. The definition of the particular auditory scene will vary from application to application. For example, the output generated by beamformer 404 may correspond to a desired beam pattern steered towards the sound source.

As shown in FIG. 4, distance estimation unit 408 receives the four eigenbeam outputs from decomposer 402 and generates an estimate of the distance $r_L$ between the center of the microphone array and the source of the sound signals received by the microphones of the array. This estimated distance is used to generate filter weights 405, which are applied by response compensation unit 414 to compensate the frequency and amplitude response of the microphone array for the distance between the array and the sound source. In addition, distance estimation unit 408 generates distance information 407, which is applied to both beam combination unit 416 and audio processor 406.

In one possible implementation, if the estimated distance $r_L$ is less than a specified distance threshold value (e.g., about eight times the radius of the spherical array), then distance estimation unit 408 determines that the sound source is a nearfield sound source. Alternatively, distance estimation unit 408 can compare the difference between beam levels against a suitable threshold value. If the level difference between two different eigenbeam orders is smaller than the specified threshold value, then the sound source is determined to be a nearfield sound source.

In any case, if the sound source is determined to be a nearfield sound source, then distance estimation unit 408 transmits a control signal 409 to turn on orientation estimation unit 410. Otherwise, distance estimation unit 408 determines that the sound source is a farfield sound source and configures control signal 409 to turn off orientation estimation unit 410. In another possible implementation, orientation estimation unit 410 is always on, and control signal 409 can be omitted.

As indicated in FIG. 4, orientation estimation unit 410 receives the three eigenbeam outputs $Y_1^m$ of order n=1 and generates steering weights 411, which depend on the angular orientation of the microphone array to the sound source. These steering weights are used by direction compensation unit 412 to compensate the three eigenbeam outputs $Y_1^m$ of order n=1 for that estimated angular orientation. In effect, direction compensation unit 412 processes the three first-order eigenbeam outputs to form and steer a first-order beam 413 of the microphone array towards the estimated direction of the sound source. It is to this first-order beam that response compensation unit 414 applies its frequency and amplitude compensation based on filter weights 405 received from distance estimation unit 408. Note that, if orientation estimation unit 410 is off, then direction compensation unit 412 can be designed to apply a set of default steering weights to form and steer first-order beam 413 in a default direction (e.g., maintain the last direction or steer to a default zero-position marked on the array).

In addition, orientation estimation unit 410 generates direction information 421, which is applied to both beam combination unit 416 and audio processor 406.

Beam combination unit 416 combines (e.g., sums) the compensated first-order beam 415 generated by response compensation unit 414 with the zero-order beam represented by the eigenbeam output $Y_0$ to generate steered beam 417. In applications in which only first-order beam 415 is needed, beam combination unit 416 may be omitted and first-order beam 415 may be applied directly to audio processor 406. The output of beamformer 404 is steered beam 417 generated by the four-sensor microphone array whose sensitivity has been optimized in the estimated direction of the sound source and whose frequency and amplitude response has been compensated based on the estimated distance between the array and the sound source.

As suggested earlier, depending on the particular application, audio processor 406 can be provided to perform suitable audio processing on steered beam 417 to generate the output auditory scene 419.

Beamformer 404 exploits the geometry of the spherical array and relies on the spherical harmonic decomposition of the incoming sound field by decomposer 402 to construct a desired spatial response. Beamformer 404 can provide continuous steering of the beampattern in 3-D space by changing a few scalar multipliers, while the filters determining the beampattern itself remain constant. The shape of the beampattern is invariant with respect to the steering direction. Instead of using a filter for each audio sensor as in a conventional filter-and-sum beamformer, beamformer 404 needs only one filter per spherical harmonic, which can significantly reduce the computational cost.

Audio system 400 with the spherical array geometry of Table I enables accurate control over the beampattern in 3-D space. In addition to focused beams, system 400 can also provide multi-direction beampatterns or toroidal beampatterns giving uniform directivity in one plane. These properties can be useful for applications such as general multichannel speech pick-up, video conferencing, or direction of arrival (DOA) estimation. It can also be used as an analysis tool for room acoustics to measure directional properties of the sound field.

Audio system 400 offers another advantage: it supports decomposition of the sound field into mutually orthogonal components, the eigenbeams (e.g., spherical harmonics) that can be used to reproduce the sound field. The eigenbeams are also suitable for wave field synthesis (WFS) methods that enable spatially accurate sound reproduction in a fairly large volume, allowing reproduction of the sound field that is present around the recording sphere. This allows a wide variety of general real-time spatial audio applications.

Eigenbeam Decomposition

This section describes the mathematics underlying the processing of modal decomposer 402 of FIG. 4.

A spherical acoustic wave can be described according to Equation (1) as follows:

$$G(k, R, t) = A\frac{e^{i(\omega t - kR)}}{R} \quad A \le R, \tag{1}$$

where k is the wave number, i is the imaginary constant (i.e., positive root of −1), R is the distance between the source of the sound signals and the measurement point, and A is the source dimension (also referred to as the source strength).

Expanding Equation (1) into a series of spherical harmonics yields Equation (2) as follows:

$$G(k, R_s, R_L) = -4\pi Aki\sum_{n=0}^{\infty} h_n^{(2)}(kr_L)b_n(kr_s)\sum_{m=-n}^{n} Y_n^m(\vartheta_L, \varphi_L)Y_n^{m*}(\vartheta_s, \varphi_s), \tag{2}$$

where the symbol "*" represents complex conjugate, $R_s$ is the sensor position $[r_s, \upsilon_s, \phi_s]$, $R_L$ is the source position $[r_L, \upsilon_L, \phi_L]$, $h_n^{(2)}$ is the spherical Hankel function of the second kind, $Y_n^m$ is the spherical harmonic of order n and degree m, and $b_n$ is the normalized farfield mode strength. The spherical harmonics $Y_n^m$ are defined according to Equation (3) as follows:

$$Y_n^m(\vartheta, \varphi) = \sqrt{\frac{2n+1}{4\pi}\sqrt{\frac{(n-m)!}{(n+m)!}}\, P_n^m(\cos(\vartheta))e^{im\varphi}}, \tag{3}$$

where $P_n^m$ are the associated Legendre polynomials. Spherical harmonics possess the desirable property of orthonormality. For sensors mounted on an acoustically rigid sphere with radius a, where the center of the sphere is located at the origin of the coordinate system, the normalized farfield mode strength $b_n$ is defined according to Equation (4) as follows:

$$b_n = (ka) = j_n(ka) - \frac{j_n'(ka)}{h_n^{(2)\prime}(ka)}h_n^{(2)}(ka), \tag{4}$$

where the prime symbol represents derivative with respect to the argument, and $j_n$ is the spherical Bessel function of order n.

The orthonormal component $Y_n^m(\upsilon_s,\phi_s)$ corresponding to the spherical harmonic of order n and degree m of the soundfield can be extracted if the spherical microphone involves a continuous aperture sensitivity $M(\upsilon_s,\phi_s)$ that is proportional to that component. Using a microphone with this sensitivity results in an output $c_{nm}$ that represents the corresponding orthonormal component of the soundfield according to Equation (5) as follows:

$$\begin{aligned} c_{nm} &= kh_n^{(2)}(kr_L)b_n(ka)Y_n^m(\vartheta_L, \varphi_L) \\ &= b_n^s(kr_L, ka)Y_n^m(\vartheta_L, \varphi_L), \end{aligned} \tag{5}$$

where $b_n^s$ is the normalized nearfield mode strength. Note that the constant factor 4πiA has been neglected in Equation (5).

Figure 5:
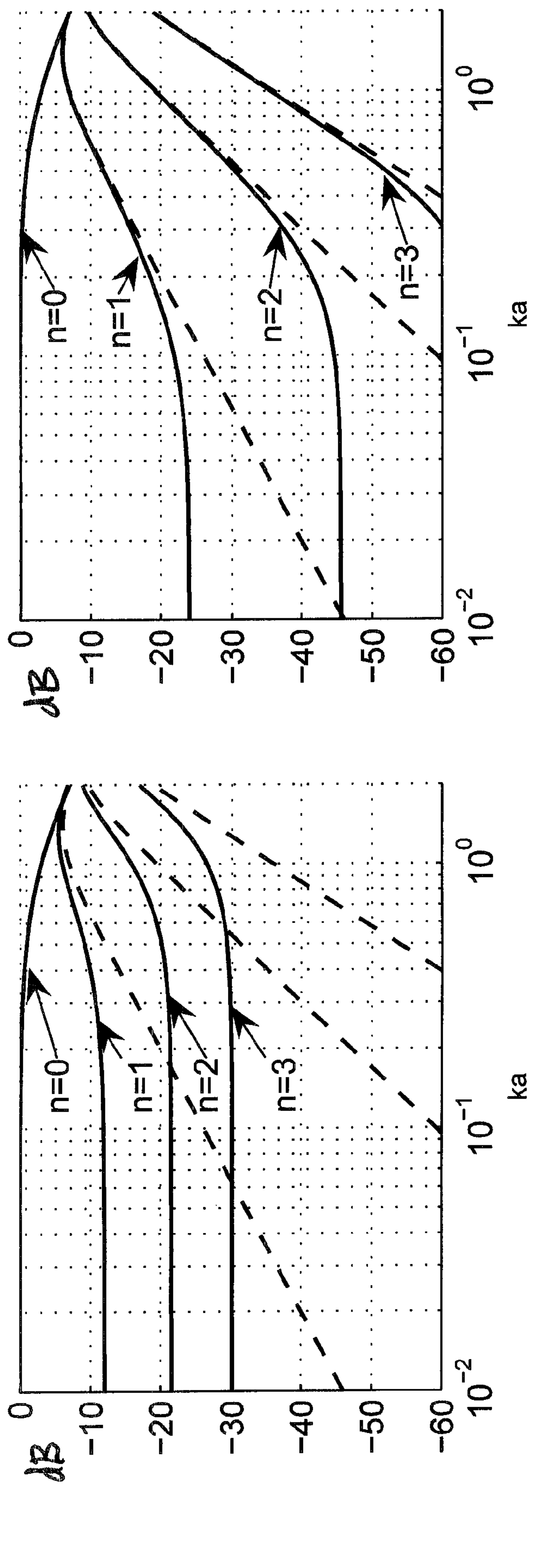
FIGS. 5(*a*) and 5(*b*) show graphical representations of the magnitudes of the normalized nearfield and farfield mode strengths for spherical harmonic orders n=0, 1, 2, 3 for a continuous spherical microphone covering the surface of an acoustically rigid sphere.

FIG. 5 shows graphical representations of the magnitudes of the normalized nearfield mode strength $b_n^s$ (solid lines) and the farfield mode strength $b_n$ (dashed lines) for spherical harmonic orders n=0, 1, 2, 3 for a continuous spherical microphone covering the surface of an acoustically rigid sphere. In particular, for FIG. 5(*a*), the distance $r_L$ from the center of the sphere to the sound source is 2*a*, while, for FIG. 5(*b*), $r_L$=8a, where a is the radius of the sphere.

Distance Estimation

This section describes the mathematics underlying the processing of distance estimation unit 408 of FIG. 4.

As suggested by FIGS. 5(*a*) and 5(*b*), the distance $r_L$ between the sound source and the microphone array can be estimated from the level differences between any two orders at low frequencies. For a general orientation of the array, the energy of the nth order mode is distributed across the mode's different degrees m. The overall energy for a mode of order n can be found using Equation (6) as follows:

$$\sum_{m=-n}^{n} |Y_n^m(\vartheta, \varphi)|^2 = \frac{2n+1}{4\pi} = |Y_n^0(0, 0)|^2. \tag{6}$$

The overall mode strength is determined by combining Equations (5) and (6) to yield Equation (7) as follows:

$$\sum_{m=-n}^{n}|c_{nm}|^2=\sum_{m=-n}^{n}|b_n^s(kr_L,ka)Y_n^m(\vartheta_L,\varphi_L)|^2=\frac{2\pi+1}{4\pi}|b_n^s(kr_L,ka)|^2. \tag{7}$$

A low-frequency approximation of the normalized mode strength reveals a relatively simple expression for the ratios that can be used to determine the distance $r_L$. For the modes of order n=0,1,2, these ratios are given by Equations (8) as follows:

$$\frac{b_1^s}{b_0^s}=\frac{a}{2r_L},\ \frac{b_2^s}{b_0^s}=\frac{a^2}{3r_L^2},\ \frac{b_2^s}{b_1^s}=\frac{2a}{3r_L}. \tag{8}$$

Combining Equations (7) and (8), the distance $r_L$ can be computed using the ratio of the zero- and first-order modes according to Equation (9) as follows:

$$r_L=\sqrt{\frac{3}{4}a^2\frac{|c_{00}|^2}{\sum_{m=-1}^{1}|c_{1m}|^2}}. \tag{9}$$

Alternatively, the distance $r_L$ can be computed using the ratio of the first- and second-order modes according to Equation (10) as follows:

$$r_L=\sqrt{\frac{20}{27}a^2\frac{\sum_{m=-1}^{1}|c_{1m}|^2}{\sum_{m=-2}^{2}|c_{2m}|^2}}. \tag{10}$$

Orientation Estimation and Direction Compensation

This section describes the mathematics underlying the processing of orientation estimation unit 410 and direction compensation unit 412 of FIG. 4.

For best SNR-gain performance, the maximum sensitivity of the microphone array should be oriented towards the sound source. Once the overall mode strength for order n is determined using Equation (7), the contribution of each mode of order n and degree m, represented by the value of the corresponding spherical harmonic, can be found using Equation (11) as follows:

$$|Y_n^m(\vartheta_L,\varphi_L)|=\sqrt{\frac{|c_{nm}|^2}{\frac{4\pi}{2n+1}\sum_{p=-n}^{n}|c_{np}|^2}}. \tag{11}$$

The phase of the spherical harmonic can be recovered by comparing the phase of the signals $C_{nm}$. Note that it is not important to know the absolute phase. Using Equation (6), the complex conjugate of the recovered values of the spherical harmonics are the steering coefficients to obtain the maximum output signal y according to Equation (12) as follows:

$$y=e^{i\alpha}\sum_{m=-n}^{n}c_{nm}Y_n^{m*}(\vartheta_L,\varphi_L)=e^{i\alpha}\frac{2n+1}{4\pi}b_n^s, \tag{12}$$

where α is the unknown absolute phase.

The steering operation is analogous to an optimal weight-and-sum beamformer that maximizes the SNR towards the look-direction by compensating for the travel delay (done here using the complex conjugate) and by weighting the signals according to the pressure magnitude. In order to maintain the magnitude of the eigenbeams, the steering weights should be normalized by $\sqrt{4\pi/(2n+1)}$.

Response Compensation

This section describes the mathematics underlying the processing of response compensation unit 414 of FIG. 4.

Given the distance $r_L$ from the microphone array to the sound source, e.g., as estimated using Equation (9) or (10), the frequency response of a correction filter for response compensation unit 414 can be computed. The ideal compensation is equal to $1/b_n^s(kr_L, ka)$. However, this might not be practical for some applications, since it could be computationally expensive. One technique is to compute a set of compensation filters in advance for different distances. Response compensation unit 414 can then select and switch between different pre-computed filters depending on the estimated distance. Temporal smoothing should be implemented to avoid a hard transition from one filter to another.

Another technique is to break the frequency response down into several simpler filters. The frequency response of the eigenbeams can be expressed according to Equation (13) as follows:

$$b_n^s(kr_L,ka)=kh_n^{(2)}(kr_L)\frac{i}{(ka)^2h_n^{(2)\prime}(ka)}, \tag{13}$$

where the first term on the right-hand side of the equation is a nearfield term, and the second term is a farfield term. The farfield term is equivalent to Equation (4) expressed in a different way. For most applications, the radius of the spherical array will be sufficiently small to allow the use of the low-frequency approximation for the farfield term according to Equation (14) as follows:

$$b_1^f(ka)\approx\frac{ka}{2}\ \text{for } ka<1;$$
$$b_2^f(ka)\approx\frac{(ka)^2}{9}\ \text{for } ka<1, \tag{14}$$

where the superscript f denotes the farfield response.

The nearfield response can be written as a polynomial. For the second-order node, the nearfield response may be given by Equation (15) as follows:

$$b_2^n(kr_L)=\frac{1}{r_L}\frac{i(3+3ikr_L-(kr_L)^2)}{(kr_L)^2}, \tag{15}$$

and, for the first-order mode, the nearfield response may be given by Equation (16) as follows:

$$b_1^n(kr_L)=\frac{1}{r_L}\frac{-i+kr_L}{kr_L}, \tag{16}$$

where the superscript n denotes the nearfield response. Note that Equations (15) and (16) omit the linear phase component $\exp(-ikr_L)$, which is implicitly included in the original nearfield term in Equation (13) within $h_n$.

Beam Combination

This section describes the processing of beam combination unit 416 of FIG. 4.

In one possible implementation, beam combination unit 416 generates steered beam 417 by simply adding together the compensated first-order beam 415 generated by response compensation unit 414 and the zero-order beam represented by the eigenbeam output $Y_0$. In other implementations, the first- and zero-order beams can be combined using some form of weighted summation.

Since the underlying associated signal processing yields distance and direction estimates of the sound source, one could also determine whether the sound source is a nearfield source or a farfield source (e.g., by thresholding the distance estimate). As such, beam combination unit 416 can be implemented to be adjusted either adaptively or through a computation dependent on the estimation of the direction of a farfield source. This computed or adapted farfield beamformer could be operated such that the output power of the microphone array is minimized under a constraint that nearfield sources will not be significantly attenuated. In this way, farfield signal power can be minimized without significantly affecting any nearfield signal power.

Other Exemplary Embodiments

FIG. 4 shows first-order audio system 400, which generates a steered beam 417 having zero-order and first-order components, based on the audio signals generated by the four appropriately located audio sensors 202 of microphone array 200 of FIG. 2. In alternative embodiments of the present invention, higher-order audio systems can be implemented to generate steered beams having higher-order components, based on the audio signals generated by an appropriate number of appropriately located audio sensors.

Figure 7:
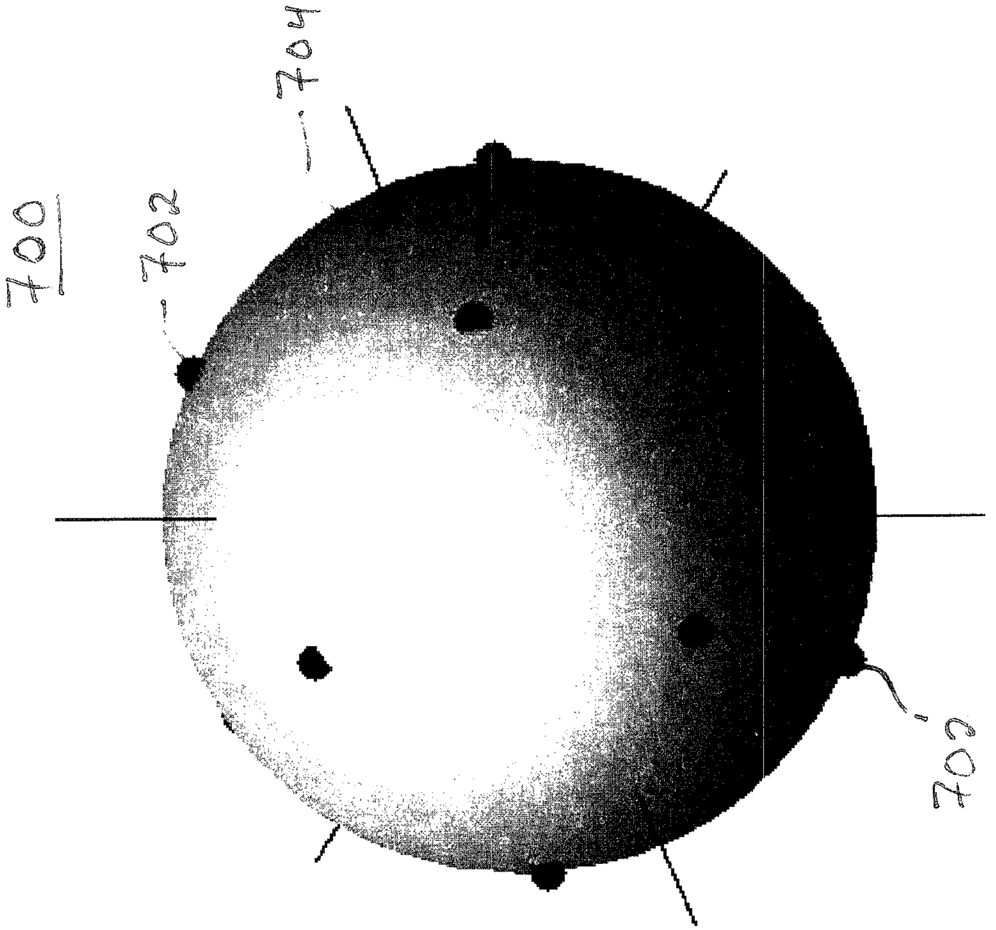
FIG. 7 shows a schematic diagram of a twelve-sensor microphone array.

For example, FIG. 7 shows a schematic diagram of a twelve-sensor microphone array 700 having twelve microphones 702 positioned on the surface of an acoustically rigid sphere 704 at the spherical coordinates specified in Table II, where the origin is at the center of the sphere, the elevation angle is measured from the Z axis, and the azimuth angle is measured from the X axis in the XY plane, as indicated by the spherical coordinate system represented in FIG. 3. Microphone array 700 supports a discrete second-order harmonic expansion involving the zero-order eigenbeam $Y_0$, the three first-order eigenbeams ($Y_1^{-1}, Y_1^{0}, Y_1^{1}$), and the five second-order eigenbeams ($Y_2^{-2}, Y_2^{-1}, Y_2^{0}, Y_2^{1}, Y_2^{2}$). Note that, although nine is the minimum number of appropriately located audio sensors for a second-order harmonic expansion, more than nine appropriately located audio sensors can also be used to support a second-order harmonic expansion.

TABLE II

TWELVE-MICROPHONE ARRAY

| Microphone | Azimuth Angle ($\phi$) | Elevation Angle ($\upsilon$) |
|---|---|---|
| #1 | 0° | 121.7° |
| #2 | 301.7° | 90° |
| #3 | 270° | 31.7° |
| #4 | 0° | 58.3° |
| #5 | 238.3° | 90° |
| #6 | 90° | 148.3° |
| #7 | 180° | 121.7° |
| #8 | 121.7° | 90° |
| #9 | 90° | 31.7° |
| #10 | 180° | 58.3° |
| #11 | 58.3° | 90° |
| #12 | 270° | 148.3° |

Figure 8:
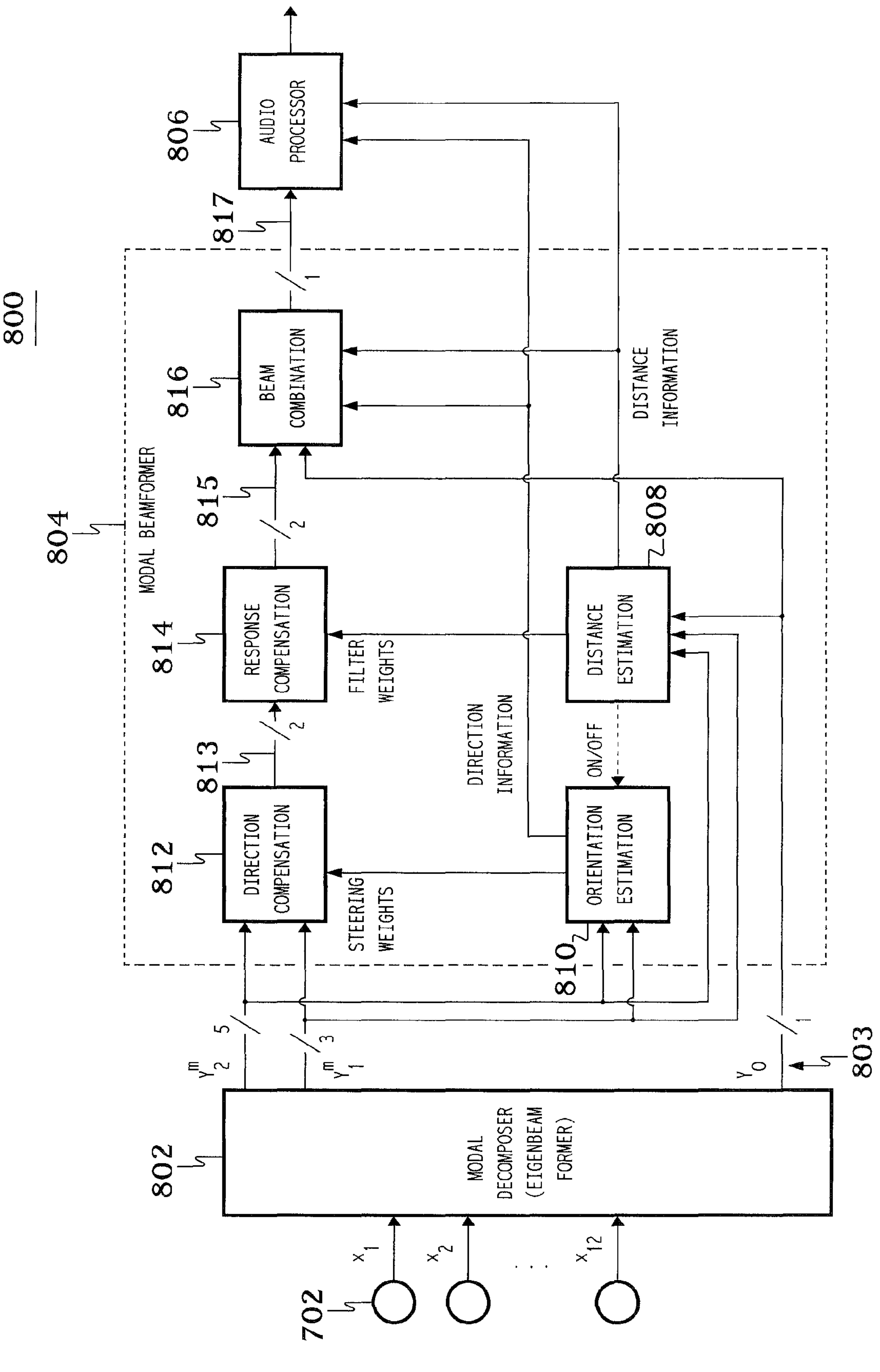
FIG. 8 shows a block diagram of a second-order audio system, according to one embodiment of the present invention.

FIG. 8 shows a block diagram of a second-order audio system 800, according to one embodiment of the present invention, based on microphone array 700 of FIG. 7. Audio system 800 comprises the twelve microphones 702 of FIG. 7 mounted on acoustically rigid sphere 704 (not shown in FIG. 8) in the locations specified in Table II. In addition, audio system 800 includes a modal decomposer (i.e., eigenbeam former) 802, a modal beamformer 804, and an (optional) audio processor 806. In this particular embodiment, modal beamformer 804 comprises distance estimation unit 808, orientation estimation unit 810, direction compensation unit 812, response compensation unit 814, and beam combination unit 816.

The various processing units and signals of second-order audio system 800 shown in FIG. 8 are analogous to corresponding processing units and signals of first-order audio system 400 shown in FIG. 4. Note that, in addition to generating the zero-order eigenbeam $Y_0$ and the three first-order eigenbeams ($Y_1^{-1}, Y_1^{0}, Y_1^{1}$), decomposer 802 generates the five second-order eigenbeams ($Y_2^{-2}, Y_2^{-1}, Y_2^{0}, Y_2^{1}, Y_2^{2}$), which are applied to distance estimation unit 808, orientation estimation unit 810, and direction compensation unit 812.

In one possible implementation, the processing of distance estimation unit 808 is based on Equations (8) and (10), while the processing of orientation estimation unit 810 and direction compensation unit 812 is based on Equations (11) and (12). Note that direction compensation unit 812 generates two beams 813: a first-order beam (analogous to first-order beam 413 in FIG. 4) and a second-order beam. Similarly, response compensation unit 814 generates two compensated beams 815: one for the first-order beam received from direction compensation unit 812 and one for the second-order beam received from direction compensation unit 812. Note further that beam combination unit 816 combines (e.g., sums) the first- and second-order compensated beams 815 received from response compensation unit 814 with the zero-order beam represented by the eigenbeam output $Y_0$ to generate steered beam 817. In one possible implementation, the processing of response compensation unit 814 is based on Equations (13)-(15).

Another possible embodiment involves a microphone array having only two audio sensors. In this case, the two microphone signals can be decomposed into two eigenbeam outputs: a zero-order eigenbeam output corresponding to the sum of the two microphone signals and a first-order eigenbeam output corresponding to the difference between the two microphone signals. Although orientation estimation would not be performed, the distance $r_L$ from the midpoint of the microphone array to a sound source can be estimated based on the first expression in Equation (8), where (i) a is the distance between the two microphones in the array and (ii) the two microphones and the sound source are substantially co-linear (i.e., the so-called endfire orientation). As before, the estimated distance can be thresholded to determine whether the sound source is a nearfield source or a farfield source. This would enable, for example, farfield signal energy to be attenuated, while leaving nearfield signal energy substantially unattenuated. Note that, for this embodiment, the modal beamformer can be implemented without an orientation estimation unit and a direction compensation unit.

Implementation Issues

From an implementation point of view, it may be advantageous to work with real values rather than the complex spherical harmonics. For example, this would enable a straightforward time-domain implementation. The following property of Equation (17) is based on the definition of the spherical harmonics in Equation (3):

$$Y_n^{-m}=(-1)^m Y_n^{m*}. \tag{17}$$

Using this property, which is based on the even and odd symmetry properties of functions, expressions for the real and imaginary parts of the spherical harmonics can be derived according to Equations (18) and (19) as follows:

$$\begin{aligned}\frac{1}{2}(Y_n^m + Y_n^{-m}) &= \mathrm{Re}\{Y_n^m\} \text{ for } m \text{ even,}\\ &= i\,\mathrm{Im}\{Y_n^m\} \text{ for } m \text{ odd.}\end{aligned} \tag{18}$$

$$\begin{aligned}\frac{1}{2}(Y_n^m - Y_n^{-m}) &= \mathrm{Re}\{Y_n^m\} \text{ for } m \text{ odd,}\\ &= i\,\mathrm{Im}\{Y_n^m\} \text{ for } m \text{ even.}\end{aligned} \tag{19}$$

Using these equations, the results of the previous sections can be modified to be based on the real-valued real and imaginary parts of the spherical harmonics rather than the complex spherical harmonics themselves.

Figure 6:
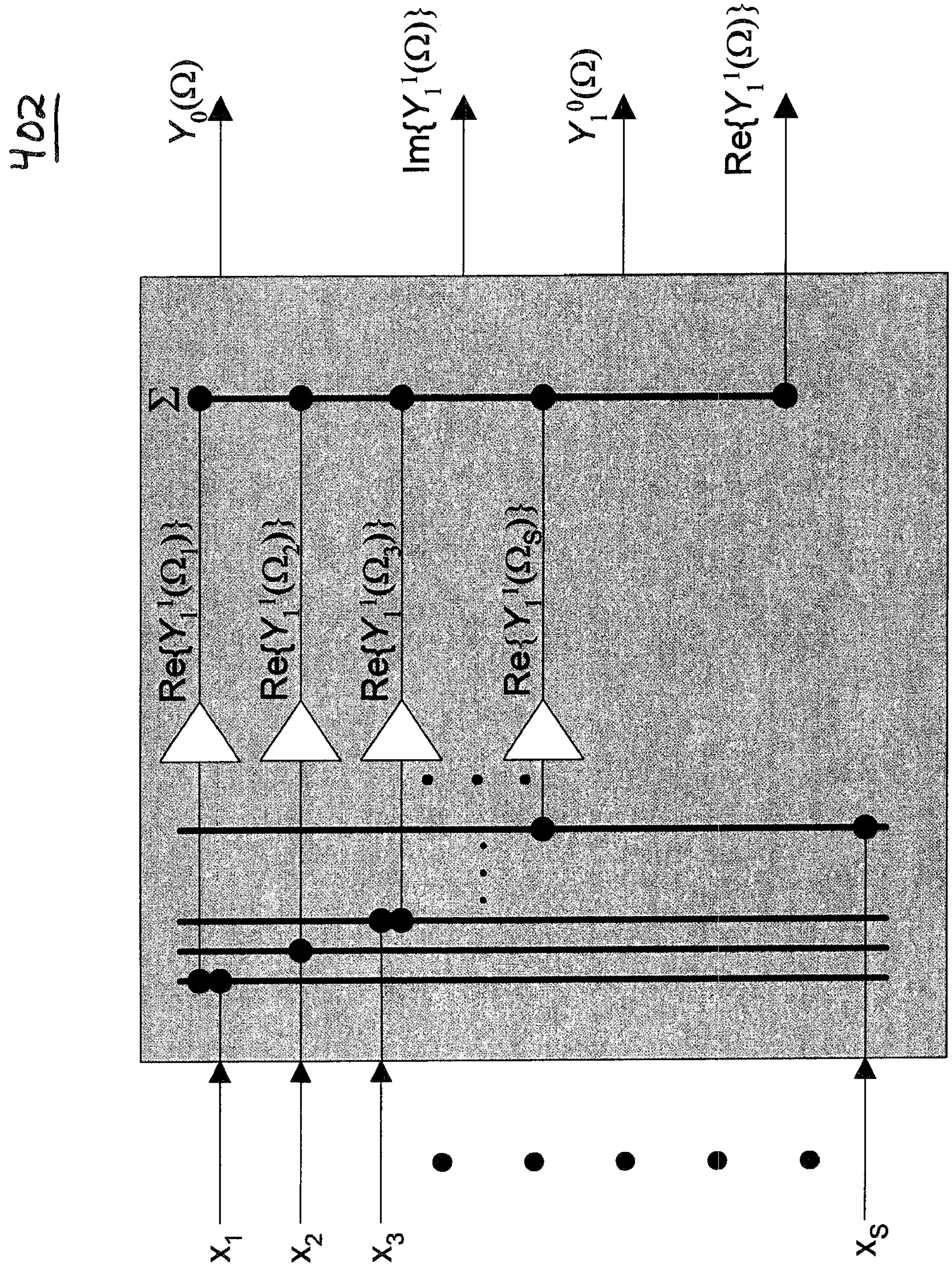
FIG. 6 shows a block diagram of the structure of an exemplary implementation of the modal decomposer of FIG. 4 based on the real and imaginary parts of the spherical harmonics.

In particular, the eigenbeam weights from Equation (3) are replaced by the real and imaginary parts of the spherical harmonics. In this case, the structure of modal decomposer 402 of FIG. 4 is shown in FIG. 6. As shown in FIG. 6, the S microphone signals $x_s$ are applied to decomposer 402, which consists of several weight-and-add beamformers. FIG. 6 depicts the appropriate weighting for generating $\mathrm{Re}\{Y_1^{\,1}(\Omega)\}$ (i.e., the real part of the eigenbeam of order n=1 and degree m=1), where the symbol $\Omega_s$ represents the spherical coordinates $[\upsilon_s,\phi_s]$ of the location for sensor s. The other eigenbeams are generated in an analogous manner.

For one possible implementation, all eigenbeams of two different orders n are used, where each order n has 2n+1 components. For example, using the zero and first orders involves four eigenbeams: the single zero-order eigenbeam and the three first-order eigenbeams. Alternatively, using the first and second orders involves eight eigenbeams: the three first-order eigenbeams and the five second-order eigenbeams.

Applications

Referring again to FIG. 4, the processing of the audio signals from the microphone array comprises two basic stages: decomposition and beamforming. Depending on the application, this signal processing can be implemented in different ways.

In one implementation, modal decomposer 402 and beamformer 404 are co-located and operate together in real time. In this case, the eigenbeam outputs generated by modal decomposer 402 are provided immediately to beamformer 404 for use in generating one or more auditory scenes in real time. The control of the beamformer can be performed on-site or remotely.

In another implementation, modal decomposer 402 and beamformer 404 both operate in real time, but are implemented in different (i.e., non-co-located) nodes. In this case, data corresponding to the eigenbeam outputs generated by modal decomposer 402, which is implemented at a first node, are transmitted (via wired and/or wireless connections) from the first node to one or more other remote nodes, within each of which a beamformer 404 is implemented to process the eigenbeam outputs recovered from the received data to generate one or more auditory scenes.

In yet another implementation, modal decomposer 402 and beamformer 404 do not both operate at the same time (i.e., beamformer 404 operates subsequent to modal decomposer 402). In this case, data corresponding to the eigenbeam outputs generated by modal decomposer 402 are stored, and, at some subsequent time, the data is retrieved and used to recover the eigenbeam outputs, which are then processed by one or more beamformers 404 to generate one or more auditory scenes. Depending on the application, the beamformers may be either co-located or non-co-located with the modal decomposer.

Each of these different implementations is represented generically in FIG. 4 by channels 403 through which the eigenbeam outputs generated by modal decomposer 402 are provided to beamformer 404. The exact implementation of channels 403 will then depend on the particular application. In FIG. 4, channels 403 are represented as a set of parallel streams of eigenbeam output data (i.e., one time-varying eigenbeam output for each eigenbeam in the spherical harmonic expansion for the microphone array).

In certain applications, a single beamformer, such as beamformer 404 of FIG. 4, is used to generate one output beam. In addition or alternatively, the eigenbeam outputs generated by modal decomposer 402 may be provided (either in real-time or non-real time, and either locally or remotely) to one or more additional beamformers, each of which is capable of independently generating one output beam from the set of eigenbeam outputs generated by decomposer 402.

Although the present invention has been described primarily in the context of a microphone array comprising a plurality of audio sensors mounted on the surface of an acoustically rigid sphere, the present invention is not so limited. For example, other acoustic impedances are possible, such as an open sphere or a soft sphere. Also, in reality, no physical structure is ever perfectly spherical, and the present invention should not be interpreted as having to be limited to such ideal structures. Moreover, the present invention can be implemented in the context of shapes other than spheres that support orthogonal harmonic expansion, such as "spheroidal" oblates and prolates, where, as used in this specification, the term "spheroidal" also covers spheres. In general, the present invention can be implemented for any shape that supports orthogonal harmonic expansion including cylindrical shapes. It will also be understood that certain deviations from ideal shapes are expected and acceptable in real-world implementations. The same real-world considerations apply to satisfying the discrete orthonormality condition applied to the locations of the sensors. Although, in an ideal world, satisfaction of the condition corresponds to the mathematical delta function, in real-world implementations, certain deviations from this exact mathematical formula are expected and acceptable. Similar real-world principles also apply to the definitions of what constitutes an acoustically rigid or acoustically soft structure.

The present invention may be implemented as (analog, digital, or a hybrid of both analog and digital) circuit-based processes, including possible implementation on a single integrated circuit. Moreover, the present invention can be implemented in either the time domain or equivalently in the frequency domain. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for processing audio signals corresponding to sound received from a sound source, the method comprising:

(a) receiving a plurality of audio signals, each audio signal having been generated by a different sensor of a microphone array;

(b) decomposing the plurality of audio signals into a plurality of eigenbeam outputs, wherein each eigenbeam output corresponds to a different eigenbeam for the microphone array;

(c) generating, based on one or more of the eigenbeam outputs, compensation data corresponding to at least one of (i) an estimate of distance between the microphone array and the sound source and (ii) an estimate of orientation of the sound source relative to the microphone array; and (d) generating an auditory scene from one or more of the eigenbeam outputs, wherein generation of the auditory scene comprises compensation based on the compensation data.

2. The invention of claim 1, wherein:

the compensation data comprises distance-based compensation data corresponding to the estimated distance;

the compensation comprises frequency response compensation based on the distance-based compensation data.

3. The invention of claim 2, wherein the distance-based compensation data is based on a comparison of overall mode strengths for two or more different mode orders of the eigenbeams.

4. The invention of claim 2, wherein:

step (c) further comprises determining whether or not the sound source is a nearfield sound source; and the compensation further comprises direction compensation only if the sound source is determined to be a nearfield sound source.

5. The invention of claim 1, wherein:

the compensation data comprises orientation-based compensation data corresponding to the estimated orientation; and the compensation comprises direction compensation based on the orientation-based compensation data.

6. The invention of claim 5, wherein the orientation-based compensation data for an eigenbeam of mode order n and mode degree m is based on a ratio between mode strength of the eigenbeam of degree m and an overall mode strength for mode order n and the relative phase of the eigenbeam of degree m relative to a reference eigenbeam.

7. The invention of claim 5, wherein the direction compensation comprises steering a beam formed from the eigenbeams in a direction based on the estimated orientation.

8. The invention of claim 7, wherein steering the beam comprises:

applying a weighting value to each eigenbeam output to form a weighted eigenbeam; and combining the weighted eigenbeams to generate the steered beam.

9. The invention of claim 5, wherein:

the direction compensation is applied to eigenbeam outputs of mode order greater than zero to generate a steered beam; and the steered beam is combined with a zero-order eigenbeam output to generate the auditory scene.

10. The invention of claim 9, wherein the combination of the steered beam and the zero-order eigenbeam output attenuates farfield signal energy while leaving nearfield signal energy substantially unattenuated in the auditory scene.

11. The invention of claim 1, wherein:

receiving the plurality of audio signals further comprises generating the plurality of audio signals using the microphone array;

the eigenbeams correspond to (i) spheroidal harmonics based on a spherical, oblate, or prolate configuration of the sensors in the microphone array or (ii) cylindrical harmonics based on cylindrical configuration of the sensors in the microphone array; and the arrangement of the sensors in the microphone array satisfies a discrete orthogonality condition.

12. The invention of claim 1, further comprising the step of further processing the auditory scene based on at least one of the estimated distance and the estimated orientation.

13. The invention of claim 1, wherein:

the plurality of audio signals comprises two audio signals;

the two audio signals are decomposed into (i) a zero-order eigenbeam output corresponding to a sum of the two audio signals and (ii) a first-order eigenbeam output corresponding to a difference between the two audio signals;

the compensation data corresponds to an estimate of the distance between the microphone array and the sound source; and the auditory scene is generated from the zero-order eigenbeam output and the first-order eigenbeam output taking into account the estimated distance.

14. An audio system for processing audio signals corresponding to sound received from a sound source, the audio system comprising:

a modal decomposer adapted to:

(1) receive a plurality of audio signals, each audio signal having been generated by a different sensor of a microphone array; and (2) decompose the plurality of audio signals into a plurality of eigenbeam outputs, wherein each eigenbeam output corresponds to a different eigenbeam for the microphone array; and a modal beamformer adapted to:

(1) generate, based on one or more of the eigenbeam outputs, compensation data corresponding to at least one of (i) an estimate of distance between the microphone array and the sound source and (ii) an estimate of orientation of the sound source relative to the microphone array; and (2) generate an auditory scene from one or more of the eigenbeam outputs, wherein generation of the auditory scene comprises compensation based on the compensation data.

15. The invention of claim 14, wherein:

the compensation data comprises distance-based compensation data corresponding to the estimated distance;

the modal beamformer is adapted to perform frequency response compensation based on the distance-based compensation data.

16. The invention of claim 15, wherein the distance-based compensation data is based on a comparison of overall mode strengths for two or more different mode orders of the eigenbeams.

17. The invention of claim 15, wherein the modal beamformer is adapted to:

determine whether or not the sound source is a nearfield sound source; and perform direction compensation only if the sound source is determined to be a nearfield sound source.

18. The invention of claim 14, wherein:

the compensation data comprises orientation-based compensation data corresponding to the estimated orientation; and the modal beamformer is adapted to perform direction compensation based on the orientation -based compensation data.

19. The invention of claim 18, wherein the orientation-based compensation data for an eigenbeam of mode order n and mode degree m is based on a ratio between mode strength of the eigenbeam of degree m and an overall mode strength for mode order n and the relative phase of the eigenbeam of degree m relative to a reference eigenbeam.

20. The invention of claim 18, wherein the modal beamformer is adapted to perform the direction compensation by steering a beam formed from the eigenbeams in a direction based on the estimated orientation.

21. The invention of claim 20, wherein the modal beamformer is adapted to steer the beam by:

applying a weighting value to each eigenbeam output to form a weighted eigenbeam; and combining the weighted eigenbeams to generate the steered beam.

22. The invention of claim 18, wherein the modal beamformer is adapted to:

apply the direction compensation to eigenbeam outputs of mode order greater than zero to generate a steered beam; and combine the steered beam with a zero-order eigenbeam output to generate the auditory scene.

23. The invention of claim 22, wherein the modal beamformer is adapted to combine the steered beam and the zero-order eigenbeam output to attenuate farfield signal energy while leaving nearfield signal energy substantially unattenuated in the auditory scene.

24. The invention of claim 14, wherein:

the audio system further comprises the microphone array;

the eigenbeams correspond to (i) spheroidal harmonics based on a spherical, oblate, or prolate configuration of the sensors in the microphone array or (ii) cylindrical harmonics based on cylindrical configuration of the sensors in the microphone array; and the arrangement of the sensors in the microphone array satisfies a discrete orthogonality condition.

25. The invention of claim 14, wherein the modal beamformer comprises:

a distance estimation unit adapted to generate distance-based compensation data from at least some of the eigenbeam outputs;

an orientation estimation unit adapted to generate estimated-orientation-based compensation data from at least some of the eigenbeam outputs;

a direction compensation unit adapted to perform direction compensation on the eigenbeam outputs based on the estimated-orientation-based compensation data to generate a steered beam; and a response compensation unit adapted to perform distance compensation on the steered beam based on the distance-based compensation data to generate the auditory scene.

26. The invention of claim 25, wherein the distance estimation unit is adapted to control whether the direction compensation is to be based on the estimated-orientation-based compensation data or on default-orientation-based compensation data.

27. The invention of claim 26, wherein:

if the distance estimation unit determines that the sound source is a nearfield sound source, then the distance estimation unit controls the direction compensation to be based on the estimated -orientation-based compensation data; and if the distance estimation unit determines that the sound source is a farfield sound source, then the distance estimation unit controls the direction compensation to be based on the default -orientation-based compensation data.

28. The invention of claim 25, wherein the modal beamformer further comprises a beam combination unit adapted to include a zero-order eigenbeam output in the auditory scene.

29. The invention of claim 25, further comprising an audio processor adapted to further process the auditory scene based on at least one of the estimated distance and the estimated orientation.

30. The invention of claim 14, wherein:

the plurality of audio signals comprises two audio signals;

the modal decomposer is adapted to decompose the two audio signals into (i) a zero-order eigenbeam output corresponding to a sum of the two audio signals and (ii) a first-order eigenbeam output corresponding to a difference between the two audio signals;

the modal beamformer is adapted to:

generate the compensation data corresponding to an estimate of the distance between the microphone array and the sound source; and generate the auditory scene from the zero-order eigenbeam output and the first-order eigenbeam output taking into account the estimated distance.

31. Apparatus for processing audio signals corresponding to sound received from a sound source, the apparatus comprising:

(a) means for receiving a plurality of audio signals, each audio signal having been generated by a different sensor of a microphone array;

(b) means for decomposing the plurality of audio signals into a plurality of eigenbeam outputs, wherein each eigenbeam output corresponds to a different eigenbeam for the microphone array;

(c) means for generating, based on one or more of the eigenbeam outputs, compensation data corresponding to at least one of (1) an estimate of distance between the microphone array and the sound source and (2) an estimate of orientation of the sound source relative to the microphone array; and (d) means for generating an auditory scene from one or more of the eigenbeam outputs, wherein generation of the auditory scene comprises compensation based on the compensation data.

* * * * *